(12) United States Patent
Arrigoni Neri et al.

(10) Patent No.: US 7,363,952 B2
(45) Date of Patent: Apr. 29, 2008

(54) NON-RETURN BLOCK FOR SNOW CHAINS HAVING INSERTS TO PROTECT WHEEL

(75) Inventors: Marcò Arrigoni Neri, Ballabio (IT); Luigi Farina, Dolzago (IT)

(73) Assignee: Thule S.p.A., Molteno (IT)

( * ) Notice: Subject to any disclaimer, the term of this patent is extended or adjusted under 35 U.S.C. 154(b) by 216 days.

(21) Appl. No.: 11/174,670

(22) Filed: Jul. 6, 2005

(65) Prior Publication Data
US 2006/0021689 A1   Feb. 2, 2006

(30) Foreign Application Priority Data
Jul. 29, 2004   (EP)   .................................. 04425580

(51) Int. Cl.
*B60C 27/10* (2006.01)
(52) U.S. Cl. .................. 152/217; 152/219; 152/241
(58) Field of Classification Search ............. 152/217, 152/219, 231, 239, 241, 173, 185, 187
See application file for complete search history.

(56) References Cited

U.S. PATENT DOCUMENTS

| 3,513,897 A | * | 5/1970 | Morris | ..................... 152/233 |
| 3,893,499 A | * | 7/1975 | Von Der Hellen | ...... 152/213 A |
| 4,390,099 A | * | 6/1983 | Trautlein et al. | ............... 211/4 |
| 4,416,319 A | * | 11/1983 | Hofmann | ................. 152/213 R |
| 5,082,039 A | * | 1/1992 | Franklin | ..................... 152/241 |
| 5,318,087 A | * | 6/1994 | Chang Gun | ................. 152/241 |
| 5,440,959 A | * | 8/1995 | Bindon et al. | ................. 83/100 |
| 5,449,090 A | * | 9/1995 | Rodriguez | .................. 221/73 |
| 5,920,962 A | * | 7/1999 | Franklin | .................. 24/116 R |
| 6,089,291 A | * | 7/2000 | Romolo et al. | ............. 152/231 |
| 7,066,227 B1 | * | 6/2006 | Stevenson, Jr. | ............. 152/222 |

FOREIGN PATENT DOCUMENTS

| EP | 1 024 035 A1 | 8/2000 |
| EP | 1 072 448 | 1/2001 |

* cited by examiner

*Primary Examiner*—Russell D. Stormer
(74) *Attorney, Agent, or Firm*—Nixon & Vanderhye PC

(57) ABSTRACT

A non return block (5) for locking a tensioning terminal portion (7) of snow chains (2), comprising a body (51) which defines a channel (12) in which the terminal portion (7) passes and a ratchet or a pawl (13) pivoted on the body (51) to lock the terminal portion (7) is described. The non-return block comprises at least one insert (62, 63) of soft material fixed to the body (51) of the non-return block so as to protrude laterally therefrom to come into contact with the rim (8) of the wheel of the vehicle, avoiding deterioration thereof through rubbing.

8 Claims, 3 Drawing Sheets

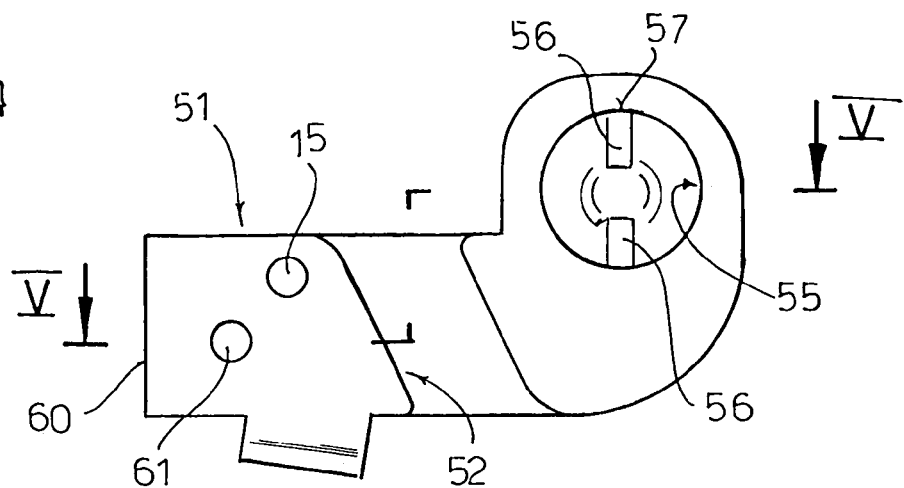
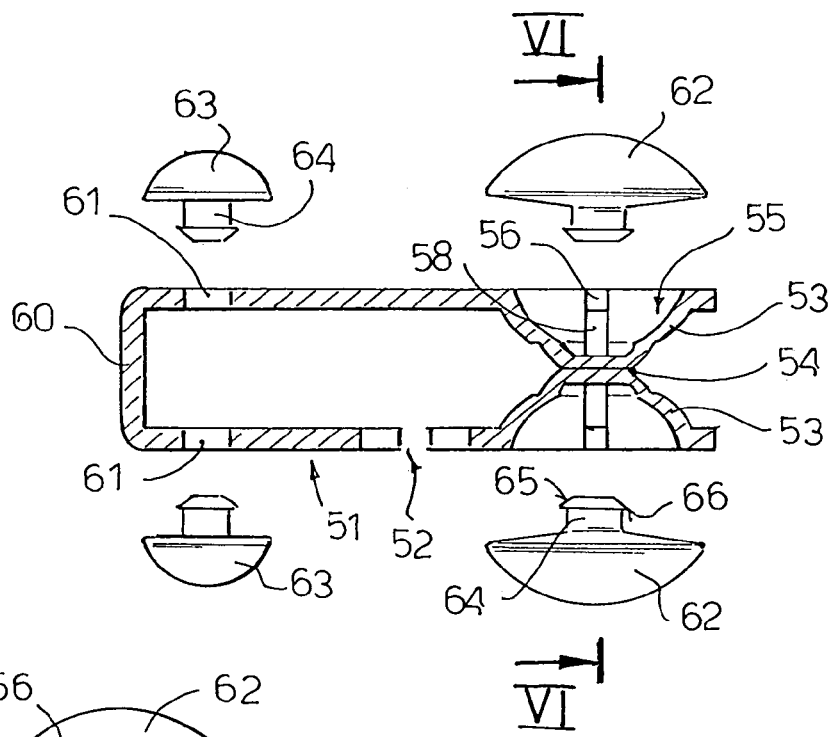
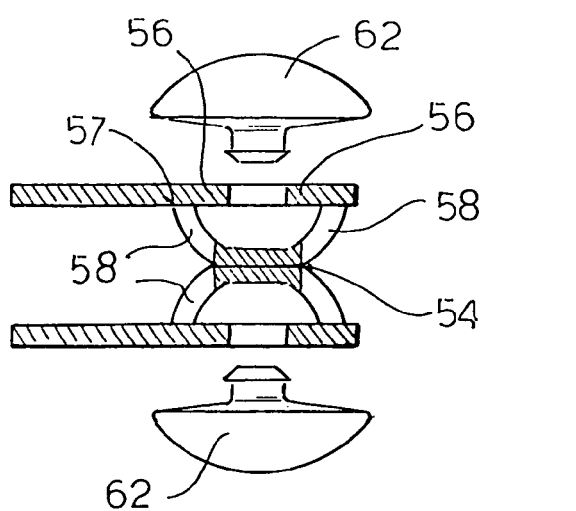

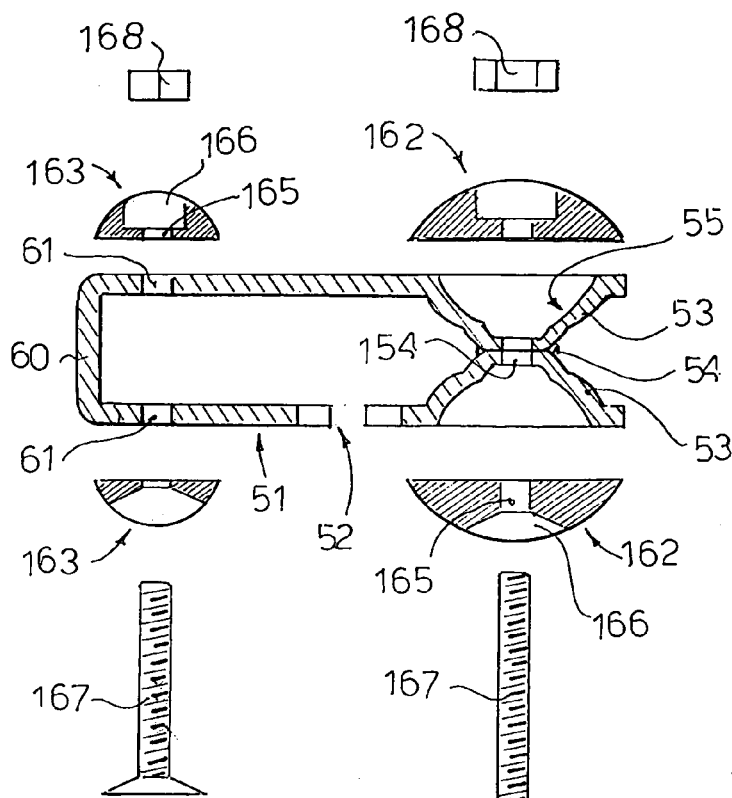
FIG. 7
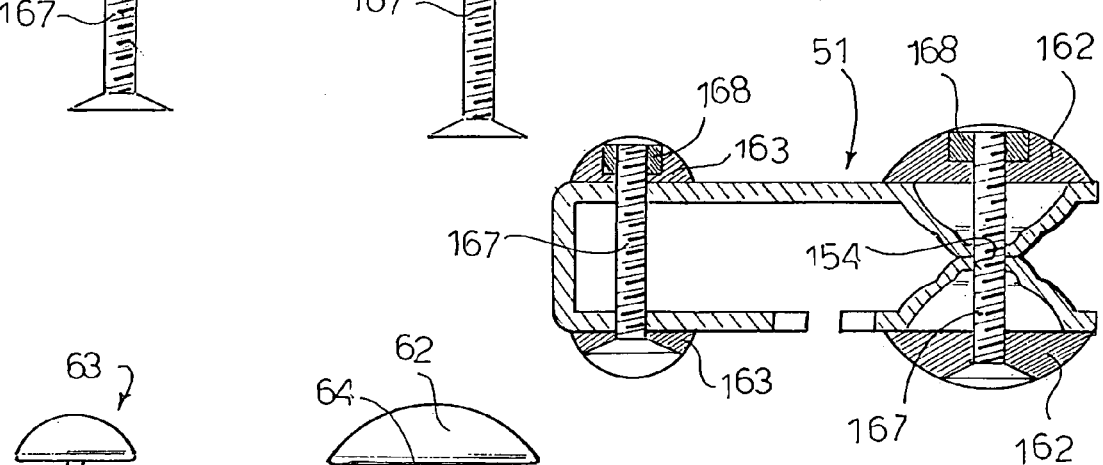
FIG. 8
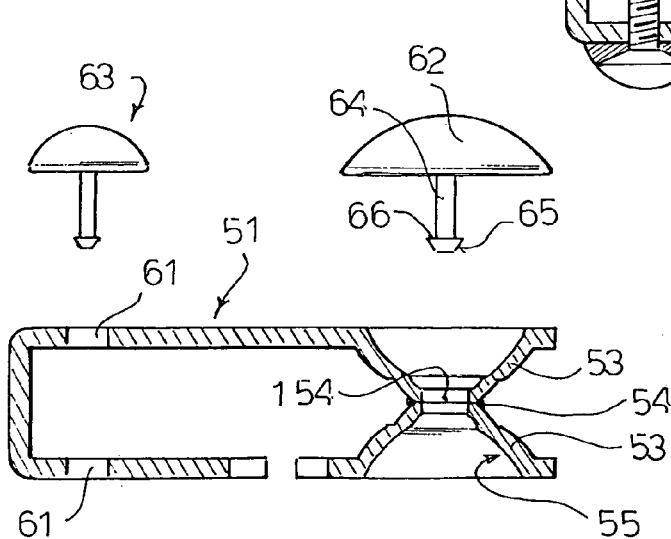
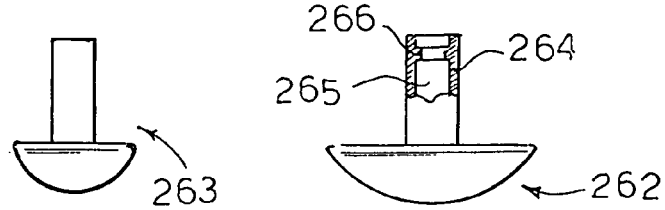
FIG. 9

NON-RETURN BLOCK FOR SNOW CHAINS HAVING INSERTS TO PROTECT WHEEL

The present invention relates to a non-return block for snow chains or anti-skid devices designed to be mounted on the tyres of vehicles.

When a vehicle travels on a road surface covered with snow, sleet or ice, its tyres do not have a good grip and dangerous swerving or skidding of the vehicle can occur. To avoid these problems it is customary to use anti-skid devices, commonly called snow chains.

Snow chains, normally mounted on the driving wheels of the vehicle, bite into the snow and/or into the ice deposited on the road surface, increasing the tread traction and allowing the vehicle tyres to achieve a good grip.

As it is known, a snow chain generally consists of two side elements (chains, flexible cables, steel wires, ropes or the like), which during use are ring-closed on the inner side and on the outer side of the wheel, respectively. These side elements are connected by a series of portions of chain variously disposed to achieve traction on the tread, the whole being completed by a tensioning device for said elements, known as a tensioner.

European patent EP 1 024 035 describes a self-tensioning device in which one end of the outer ring element of the snow chains is hooked to a non-return block and the other end comprises a free terminal portion. The terminal portion is passed through the non-return block, which allows pulling thereof in only one direction and not in the opposite direction. In this manner, by pulling the terminal portion it is possible to bring the chains under tension and once the terminal portion is released, the non-return block prevents the chains from slackening.

All elements which can come into contact with the wheel rim or with a hub-cap, such as the tensioning device and the terminal portion of the outer ring of the chain, are made of plastic material or coated with plastic material, to avoid possible rubbing against the wheel rim which would cause damage thereto, a drawback which is felt more acutely in the case of alloy wheels, which are normally more costly and delicate than steel wheels.

The non-return block of the tensioning cable of the chains, on the other hand, is made of metal to ensure good resistance and reliability, and therefore causes the aforesaid problems.

In order to avoid such problems, plastic non-return blocks have been proposed. However, such plastic blocks have not proved sufficiently reliable in withstanding the mechanical stresses to which they are subjected during use and they tend to break in the event of sharp "tugs" or in any case they not to ensure a good hold on the terminal portion of chain.

Object of the present invention is to overcome the aforesaid drawbacks by providing a non-return block for snow chains that is able to avoid damage to the wheel rims and at the same time that is reliable and able to ensure a perfect hold on the terminal portion of the chain.

Another object of the present invention is to provide a non-return block that is economical and simple to produce.

Another object of the present invention is to provide a non-return block that is practical and simple for the user to use.

The above objects are achieved by a non-return block in accordance with the invention.

Preferred embodiments of the invention are apparent form the dependent claims.

The non-return block for locking a terminal chain portion for tensioning snow chains comprises a body, which defines a channel wherein the terminal tensioning portion passes and a pawl or ratchet pivoted on the body to lock the terminal tensioning portion. The main characteristic of the invention is that the non-return block further comprises at least one insert in soft material fixed to its body so as to protrude laterally therefrom to come into contact with the wheel rim of the vehicle, preventing deterioration thereof through rubbing.

Further characteristics of the invention will be made clearer by the detailed description that follows, referring to purely exemplary and therefore non-limiting embodiments thereof, illustrated in the appended drawings, in which:

FIG. 4 is a side view of the body of the non-return block of FIG. 2;

FIG. 5 is a sectional view taken along the horizontal planes of section V-V of FIG. 4 and illustrating four inserts of soft material exploded;

FIG. 6 is a sectional view taken along the vertical plane of section VI-VI of FIG. 5;

FIG. 7 is a sectional exploded view like FIG. 5, illustrating a non-return block according to a second embodiment of the invention;

FIG. 8 is a sectional view illustrating the non-return block of FIG. 7 assembled; and FIG. 9 is a sectional exploded view like FIG. 5, illustrating a non-return block according to a third embodiment of the invention.

The non-return block according to the invention is described with the aid of the drawings.

Figure 1:
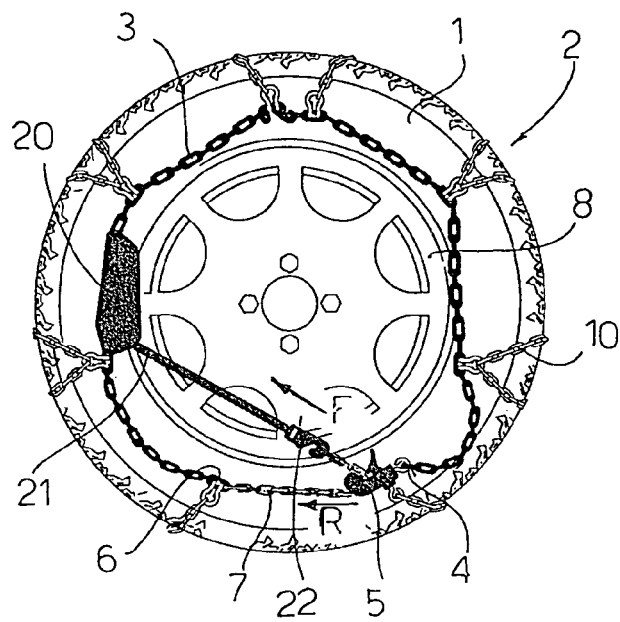
FIG. 1 is a side view of an anti-skid device, taken from the outer side of the wheel, illustrating a non-return block.

FIG. 1 shows a wheel 1 of a vehicle on which a snow chain, denoted as whole by reference numeral 2, is fitted as an anti-skid device.

The chain 2 comprises: an element (not visible) closed in a circle or in a ring on the inner side of the wheel, an element 3 disposed in a circle or in a ring on the outer side of the wheel and a series of portions of anti-skid chain 10, disposed transversally on the tread, which achieve joining between the outer element 3 and the inner element.

The outer ring 3 is hooked at one end 4 to a non-return block 5 and is connected at its other end 6 to a terminal portion of chain 7. Optionally, a storage block 20 is mounted in the outer ring element 3, said storage block containing an elastic cable 21 ending in a hook 22 destined to hook to the free end of the terminal portion 7 to bring it under tension.

The storage block 20, the hook 22 of the elastic cable and the terminal portion of the chain 7 can also be made of plastic material or of any other material suitable for avoiding possible damage to the wheel rim 8 due to the rubbing therewith.

Figure 2:
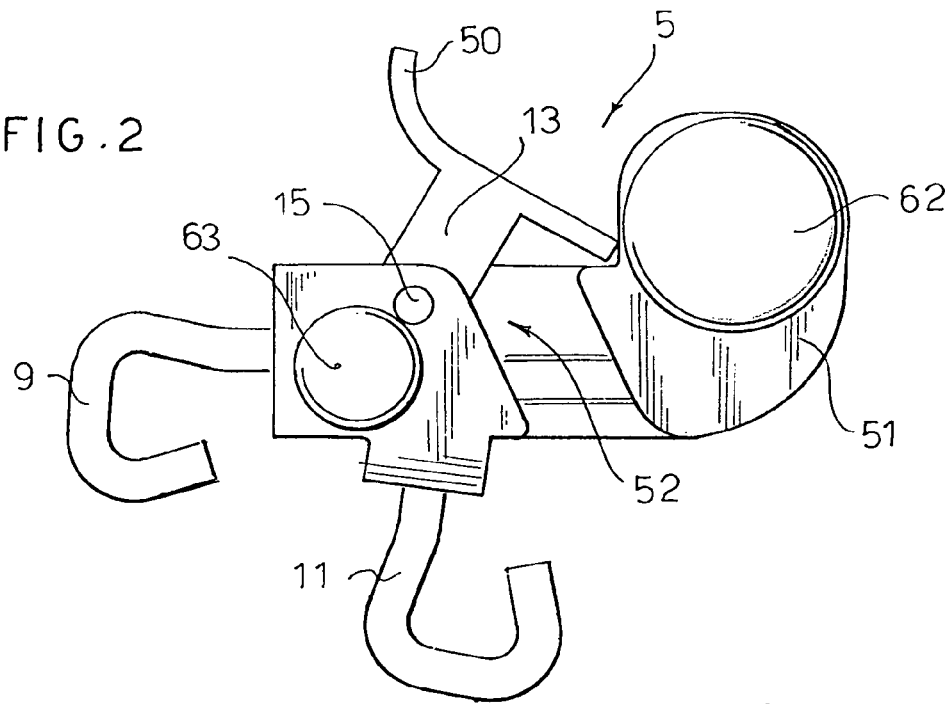
FIG. 2 is a side view of the non-return block according to a first embodiment of the invention.
Figure 3:
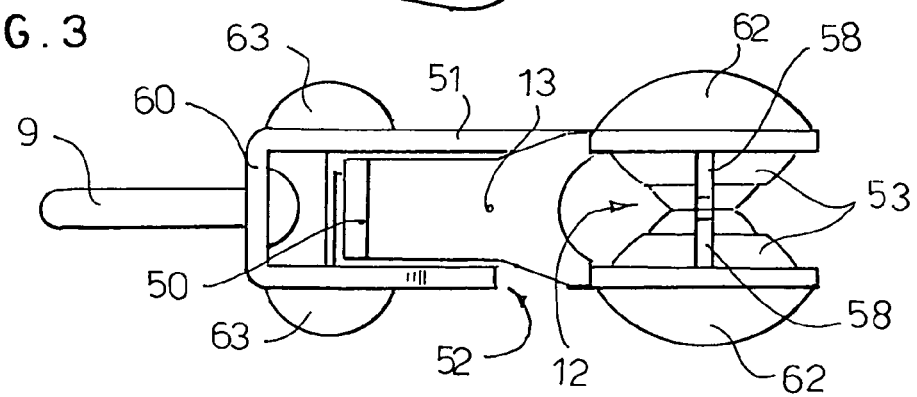
FIG. 3 is a top plan view of the non-return block of FIG. 2.

As shown better in FIGS. 2 and 3, the non-return block 5 comprises a body 51 to which a first hook 9 for hooking to the end 4 of the outer ring 3 and a second hook 11 for hooking to a portion of chain 10 are fixed.

The body 51 has a channel 12 (FIG. 3), passing vertically therethrough for the passage of the terminal portion 7. The channel 12 can be open laterally, by means of a slit 52, to facilitate insertion of the terminal portion 7.

A pawl 13 is pivoted at 15 to the body of the non-return block 5. The pawl 13 is biased by a spring (not shown) so that it is urged against a link of the terminal portion 7, acting as a ratchet.

In practice, with reference to FIG. 1, the sliding of the terminal portion 7 is allowed in the direction of the arrow F when traction in that direction is exerted, whilst the sliding in the opposite direction—represented by the arrow R—is prevented and thus any slackening of the snow chain is prevented.

When the snow chain must be removed, it is sufficient to exert a manual pressure on one end 50 of the pawl 13 which, turning around the pin 15, releases the corresponding link of the terminal portion 7. The terminal portion 7 can thus be pulled in the direction of the arrow R, slackening the chain 2.

The body 51 of the non-return block is obtained from a metal sheet which is bent in a U shape at an edge 60 in which the hook 9 is mounted. When viewed from the side the body 51 is shaped substantially as an upside-down L. The two end parts 53, distal with respect to the edge 60, protrude upwards and are rounded, drawn towards the inside and welded together along the weld 54.

The pawl 13 is substantially T-shaped when viewed from the side and it also is obtained from bent sheet metal.

With reference also to FIGS. 4, 5 and 6, the drawn parts 53 define respective frustoconical seats 55 towards the outside. Two teeth 56 are formed in each frustoconical seat, disposed in diametrically opposite positions, so as to define a narrowing of the frustoconical seats 55. Each tooth 56 can be obtained by shearing of the drawn part 53 along a U-shaped cut 58 and by folding along a fold line 57.

Near the edge 60 and at the pivot point 15, two aligned through holes 61 are formed in the body 51 folded in a U shape.

Respective inserts (62, 63) in soft material—such as for example plastic, rubber, elastomer or the like—are fixed in the two frustoconical seats 55 and in the two holes 61. The inserts (62, 63) have a substantially rounded, button-shaped configuration, like a spherical cap for example, so as to avoid sharp edges. The outer surface of the inserts is preferably flattened, although this is not shown in the drawings. The inserts 62 of the drawn seats 55 have a larger surface than the inserts 63 of the holes 61.

Each insert has axially a cylindrical tang 64 that ends in a tapered portion 65 defining an annular abutment surface 66. The annular abutment surface 66 has a diameter slightly greater than the diameter of the holes 61 and the distance between the ends of the teeth 56, respectively.

In this manner the tangs 64 of the inserts 62 engage by pressure in the narrowing defined by the teeth 56 in the seats 55 of the body of the non-return block, so as to go beyond the teeth 56 so that the annular abutment surface 66 of the tangs 64 is retained by the teeth 56. The tangs 64 of the inserts 63 engage by pressure in the holes 61 of the body of the non-return block, so as to go beyond the holes 61 so that the annular abutment surface 66 of the tangs 64 is retained by the edge of the holes 61.

Thus the four inserts (62, 63) are fixed firmly to the body 51 of the non-return block, two for each side of the body 51. In this manner, when the snow chains 1 are mounted, two inserts (62, 63) on one side of the body 51 of the non-return block 5 come into contact with the rim 8 of the wheel 1 avoiding deterioration thereof by rubbing.

It should be noted that the snow chains 1 are normally of the reversible type, that is to say they can be mounted with one side or the other of the portions of chain 10 facing towards the tread of the tyre 1. Thus the non-return block 5 can have one side or the other facing the rim 8 of the tyre.

Like or corresponding elements to those already described will henceforth be denoted with the same reference numerals and will not be described in detail.

In FIGS. 7 e 8 a second embodiment of the invention is described wherein the retaining teeth 56 of the first embodiment have been eliminated in the body 51 and a through hole 154 is formed in the weld 54 of the two drawn portions 53 of the body 51 of the non-return block.

Four inserts (162, 163) without the tangs 64 illustrated in the first embodiment are provided. Each insert (162, 163) presents axially a through hole 165 ending in a countersink 166 in the head of the inserts (162, 163). Thus the inserts (162, 163) are fixed to the body 51 by means of two screws 167. The shank of the first screw 167 passes through the hole 165 in the first insert 162, the hole 154 in the weld 54 and the hole 165 in the second insert 162 to engage with a nut 168. On the other hand the shank of the second screw 167 passes through the hole 165 in the third insert 163, the two aligned holes 61 in the body 51 and the hole 165 in the fourth insert 163 to engage with a nut 168.

As shown in FIG. 8, it should be noted that the heads of the screws 167 and the nuts 168 are recessed in the respective countersunk seats 166, so as not to protrude outward from the inserts 162 and 163.

In FIG. 9 a third embodiment is illustrated in which the body 51 of the non-return block is substantially the same as that of the second embodiment. In this case two inserts (62, 63) are substantially the same as those of the first embodiment, whereas the other two inserts (262, 263) have a cylindrical tang 264 within which an outwardly open axial seat 265 is formed. A collar 266 which defines a narrowing is provided inside said seat 265. In this manner the end 65 of the tang 64 of each insert (62, 63) is inserted by pressure in the seat 265 of the tang 264 of the opposite insert, so that the annular protrusion 66 of the tang 64 goes beyond the narrowing 266 of the seat 265 of the tang 264 and the annular protrusion 66 is retained by the collar 266.

Alternatively, the tangs 64 can be threaded on the outside to screw into the relative seats 265 of the tangs 264, threaded on the inside for this purpose.

Clearly, besides the use of press or screw fixing systems like those described, other fixing systems such as clamping, gluing, welding, riveting and the like for fixing the inserts to the body of the non-return block can be provided.

Furthermore even if in the present embodiment four inserts disposed two on each side of the body 51 of the non-return block have been illustrated, the invention also extends to the provision of at least one insert on at least one side of the body of the non-return block.

Even if substantially circular inserts have been illustrated in the figures, the invention extends to inserts of any shape. For example, substantially L-shaped inserts which follow the profile of the side surface of the body 51 can be provided. In this case the guide slit 52 for the lateral insertion of the terminal portion of chain 7 in the channel 12 of the body 51 of the non-return block can be eliminated, allowing the insertion of the terminal portion of chain 7 only from the bottom part of the channel 12.

The invention claimed is:

1. A non-return block (5) for locking a terminal tensioning portion (7) of snow chains (2), comprising a body (51) which defines a channel (12) within which the terminal portion (7) passes and a ratchet or pawl (13) pivoted to the body (51) to lock said terminal portion (7), characterised in that it comprises at least one insert (62, 63) of soft material on at least one side surface of the body (51) of the non-return block so as to protrude laterally therefrom to come into contact with the rim (8) of the wheel of the vehicle preventing deterioration thereof through rubbing, the insert of soft material (62, 63) being fixed to said body (51) of the non-return block by press fitting, wherein that the body (51) of said non-return block has a through hole (154) that puts two drawn seats (55) into communication and in that a first insert (62) comprises a tang (64) having a tapered end (65) defining an annular abutment surface (66) to allow a press fitting in a seat (265) provided with a narrowing (266) formed inside a tang (264) of a second insert (262), said communication hole (154) in the two drawn seats being able to receive the tang (264) of said second insert (262).

2. A non-return block (5) according to claim 1, characterised in that the body (51) of the non-return block is made of metal and said at least one insert (62, 63) is made of soft plastic, rubber or elastomer.

3. A non-return block (5) according to claim 1, characterised in that said insert of soft material (62, 63) is disposed on both sides of the body (51) of the non-return block for use of reversible snow chains.

4. A non-return block (5) according to claim 1 wherein the body (51) of said non-return block has two aligned through holes (61) and in that a third insert (63) comprises a tang (64) having a tapered end (65) defining an annular abutment surface (66) to allow a press fitting in a seat (265) provided with a narrowing (266) formed inside a tang (264) of a fourth insert (263), said aligned holes (61) being able to receive the tang (264) of said fourth insert (263).

5. Snow chains (2) comprising an outer element (3) that is ring-closed, constructed to be placed on the outer side of a wheel (1), an inner element that is ring-closed, constructed to be placed on an inner part of the wheel (1), said inner end outer elements being joined by chain portions (10) for achieving traction, said outer element (3) having a terminal portion (7) constructed to be pulled to tension the chain (2) after passage thereof in a non-return block (5) which allows sliding thereof only in the direction of tensioning of said chains (2) and not in the opposite direction of slackening, wherein it comprises a non-return block (5) according to claim 1.

6. A non-return block (5) for locking a terminal tensioning portion (7) of snow chains (2), comprising a body (51) which defines a channel (12) within which the terminal portion (7) passes and a ratchet or pawl (13) pivoted to the body (51) to lock said terminal portion (7), characterised in that it comprises at least one insert (62, 63) of soft material on at least one side surface of the body (51) of the non-return block so as to protrude laterally therefrom to come into contact with the rim (8) of the wheel of the vehicle preventing deterioration thereof through rubbing, the insert of soft material (162, 163) being fixed to said body (51) of the non-return block by coupling with screw means (167), wherein the body (51) of said non-return block has a through hole (154) that puts two drawn seats (55) into communication and in that each of said inserts (162) comprises a through hole (165) communicating with a recessed seat (166), in which screw means pass through the holes (165) in the inserts (162), and the hole (154) for communication of the two drawn seats (55) being able to receive the shank of said screw means (167), and the recessed seats (166) of said inserts (162) being able to receive the head of the screw means and respective nuts (168) for locking of the screw means.

7. A non-return block (5) according to claim 6 wherein the body (51) of said non-return block has two aligned through holes (61) and in that each of said inserts (163) comprises a through hole (165) communicating with a recessed seat (166), in which screw means pass through the holes (165) in the inserts (163) and the aligned holes (61) to receive the shank of such screw means (167), and the recessed seats (166) of said inserts (163) being able to receive the head of the screw means and respective nuts (168) for locking of the screw means.

8. Snow chains (2) comprising an outer element (3) that is ring-closed, constructed to be placed on the outer side of a wheel (1), an inner element that is ring-closed, constructed to be placed on an inner part of the wheel (1), said inner end outer elements being joined by chain portions (10) for achieving traction, said outer element (3) having a terminal portion (7) constructed to be pulled to tension the chain (2) after passage thereof in a non-return block (5) which allows sliding thereof only in the direction of tensioning of said chains (2) and not in the opposite direction of slackening, wherein it comprises a non-return block (5) according to claim 6.

* * * * *